United States Patent [19]

Foster

[11] Patent Number: 4,550,539
[45] Date of Patent: Nov. 5, 1985

[54] ASSEMBLAGE FORMED OF A MASS OF INTERLOCKING STRUCTURAL ELEMENTS

[76] Inventor: Terry L. Foster, 12716 Cijon St., San Diego, Calif. 92129

[21] Appl. No.: 565,391

[22] Filed: Dec. 27, 1983

[51] Int. Cl.[4] .............................................. E04C 1/30
[52] U.S. Cl. .................................... 52/236.1; 52/588; 52/731; 52/732; 446/127
[58] Field of Search ....................... 52/236.1, 588, 589, 52/593, 608–611, 648, 731, 732, 738, DIG. 10; 446/105, 115, 127

[56] References Cited

U.S. PATENT DOCUMENTS

| | | |
|---|---|---|
| 2,959,256 | 11/1960 | Deam . |
| 3,144,881 | 8/1964 | Sproull . |
| 3,420,505 | 1/1969 | Jefferys .............................. 52/731 X |
| 3,562,992 | 2/1971 | Kinsey ............................... 52/731 X |
| 3,728,837 | 4/1973 | Kiefer, Jr. ........................ 52/732 X |
| 3,940,100 | 2/1976 | Haug ................................. 52/DIG. 10 |
| 3,987,580 | 10/1976 | Ausnit ............................. 52/DIG. 10 |
| 4,104,837 | 8/1978 | Naito . |
| 4,118,903 | 10/1978 | Coulthard . |
| 4,192,119 | 3/1980 | Murphy ............................. 52/731 X |
| 4,258,858 | 3/1981 | Marling . |

Primary Examiner—Donald G. Kelly
Assistant Examiner—Richard Chilcot, Jr.
Attorney, Agent, or Firm—Jack C. Munro

[57] ABSTRACT

A structural assemblage formed of a plurality of elongated structural elements wherein abutting elements are connected together through an interlocking arrangement. Each structural element is composed of an elongated member which in transverse cross-section is constructed of a hub from which extends a plurality of sheet material panels. Each panel includes interlocking structure to matingly engage with an adjoining panel. A sufficient number of the elongated structural elements are to be connected together to form an enclosed space defining a duct. A sufficient number of the structural elements can be utilized to form a bank of ducts.

12 Claims, 5 Drawing Figures

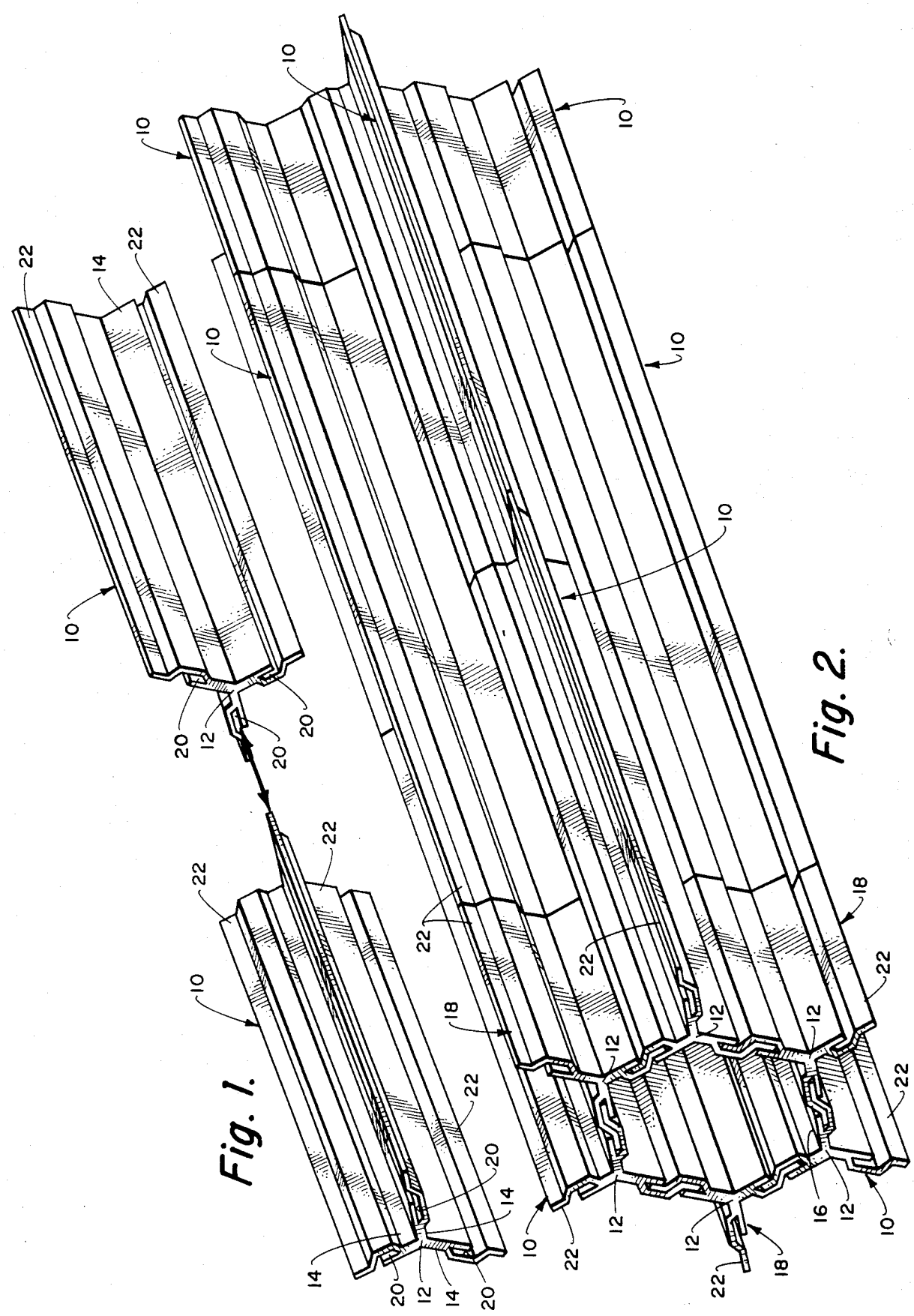

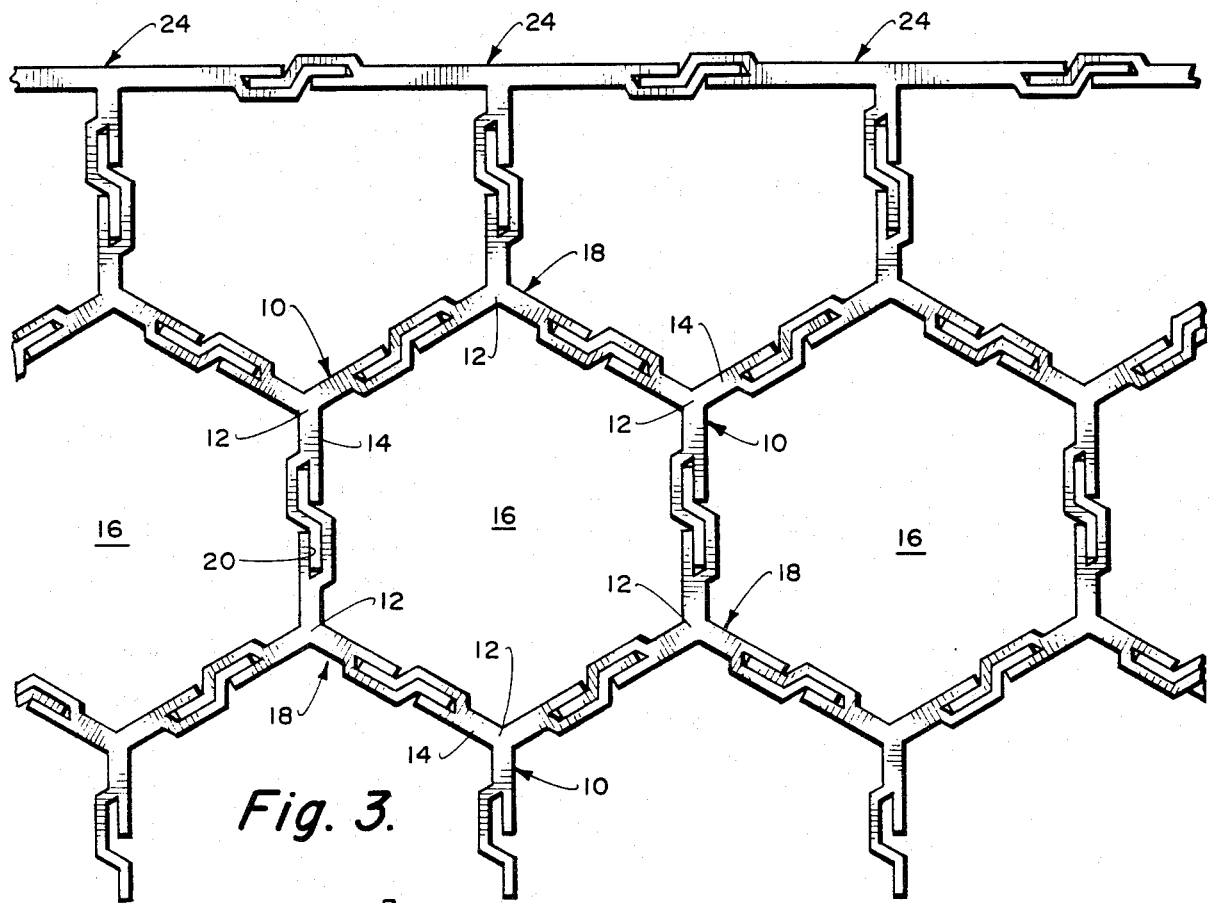
Fig. 3.
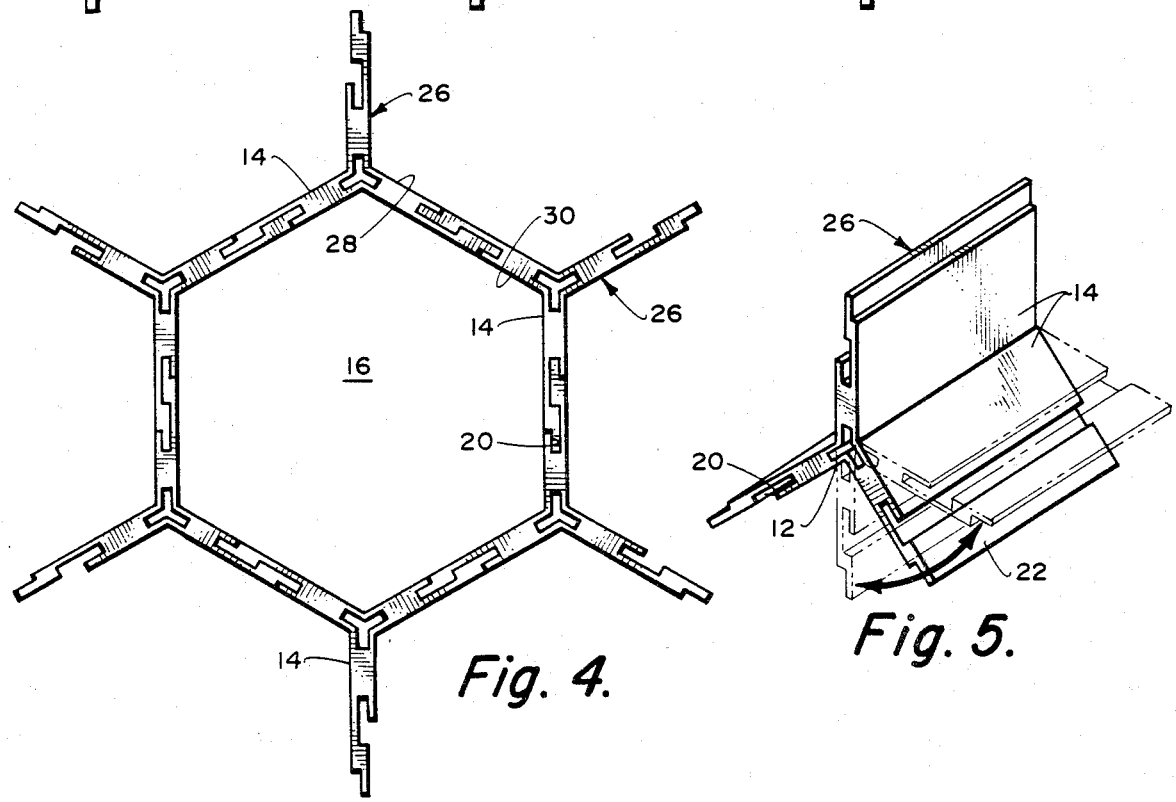
Fig. 4.
Fig. 5.

ASSEMBLAGE FORMED OF A MASS OF INTERLOCKING STRUCTURAL ELEMENTS

BACKGROUND OF THE INVENTION

The field of this invention relates to a basic structural element which can be combined with other similar structural elements is an individually desired manner in order to form a particular structure.

It has long been desirable to construct a single structural element which can be assembled with other similar structural elements to achieve a particular type of structure. It has long been desirable to be able to use the same structural element in an assemblage to achieve different types of structures.

Banks of parallel ducts have long been known to be a desirable form of structure. Such banks of parallel ducts can be referred to as a hive. Examples of uses of banks of parallel ducts would be conduits for telephone and power lines, heat exchangers, nuclear reactors, centrifugal or electrostatic dust collectors, wine racks, and houses or office units as well as potential living quarters in outer space. It is well known that this particular type of structure is particularly desirable in that the structure that is fabricated is done so with a minimum amount of wasted space. Also, the overall structure obtained has an extremely high strength to weight ratio.

SUMMARY OF THE INVENTION

The structure of the present invention is directed to a particular configuration of structural element which can be connected with other similar structural elements to form a hive-like housing. Each structural element in transverse cross-section consists of a centrally located hub from which extends a plurality of sheet material panels. The panels are evenly spaced apart in respect to each other. Each panel has a free outer edge. Adjacent the free outer edge of each panel is an interlocking structure. The interlocking structure of one panel is to connect with a similar interlocking structure of another panel of a separate structural element. The interlocking is such that a substantially continuous planar member is obtained between the interlocked panels having substantially flush abutting exterior wall surfaces. In a modified form of structural element limited flexing can occur about the panels with respect to the hub of each structural element.

A primary objective of the present invention is to provide for a hive-like structure forming a bank of parallel ducts with no wasted space between adjacent ducts.

Another primary objective of the present invention is to provide for a single structural element of which a plurality can be assembled to form a desirable overall structure.

Another objective of the present invention is to utilize a structural element which is simple and sturdy, low in cost, light in weight, having minimum volume for storage and shipping and easy to assemble by even an unskilled individual.

Another objective of the present invention is to provide a basic structural element which can be assembled to form a rigid bank of parallel ducts without requiring any bolts, clips, adhesives or special fasteners between the individual structural elements of the bank.

Another objective of the present invention is to utilize a structural element of the present invention in order to obtain a structural environment which is to be capable of continuous growth in both the transverse and the longitudinal directions.

BRIEF DESCRIPTION OF THE DRAWINGS

FIG. 1 is an exploded isometric view showing two in number of the structural elements of the present invention depicting normal assembly of such in order to achieve a desired structural environment;

FIG. 2 is an isometric view of a single duct obtained through the use of an assemblage of a plurality of structural elements of the present invention;

FIG. 3 is an end view of an assemblage of the structural elements of the present invention showing the creating of a plurality of parallel ducts forming a bank of ducts;

FIG. 4 is an end view of a single duct formed by assembling a plurality of a modified form of the structural element of the present invention in which the radial extending panels of each structural element are capable of flexing slightly with respect with the hub; and FIG. 5 is an isometric view of a single structural element of the element shown in FIG. 4 showing the flexibility of a panel within the structural element.

DETAILED DESCRIPTION OF THE SHOWN EMBODIMENT

The structure of the present invention has been designed to provide a bank of parallel ducts with no wasted space between adjacent ducts and that this invention provides a basic structural element which can be used to assemble this bank of parallel ducts. This type of construction of ducts can be quite useful. A small sized such duct could be useful as a toy. In a slightly larger size the duct could be useful as a wine rack to support a plurality of wine bottles with each duct to support an individual wine bottle. Still, in a much larger size the bank of ducts could be used as housing for human beings with doorways located through the walls separating directly adjacent ducts. This housing could be utilized not only on the earth but also within outer space.

Although it is normally intended that when the assemblage is complete that it is formed as a rigid unit, it is considered to be within the scope of this invention that one element could be movable with respect to another one for the purpose of sliding movement. An example of such a situation would be in a sliding door or possibly a sliding window where one structural element forms the jamb of the door or window while the other structural element is attached directly to the door or window.

Referring particularly to the drawings, there is shown a plurality of elongated structural elements 10 each of which is constructed in a conventional manner such as by molding or extrusion. Also, if such is desired, each of the structural elements can be manufactured out of a plurality of individual metallic parts and then assembled together as a rigid unit.

Each elongated structural element 10 includes a hub 12 from which extend radially a plurality of panels 14. It is to be noted that there have been selected three in number of the panels 14. However, it is deemed that this number of panels can be readily varied without departing in scope from this invention. Each panel 14 is integrally connected to the hub 12.

Referring particularly to FIG. 2 of the drawings, there is shown the elongated structural elements 10 being mounted in respect to each other in a staggered relationship.

The reason for this is so that additional elements 10 can be hooked on to each other in order to form a continuous elongated duct 16. In order to completely enclose the duct 16 there will be utilized shorter length structural elements 18. It is to be understood that each of the shorter length structural elements 18 will be identical in transverse cross-section to the structural elements 10. Like numerals will be utilized to refer to like parts on the drawings. It is considerably within the scope of this invention that any desirable plurality of different lengths of the structural elements could be utilized.

Each panel 14 includes an interlocking structure which takes the form of a groove 20. The outer free end of each panel 14 includes a substantially L-shaped section 22. An L-shaped section 22 on one panel 10 is to be slipped longitudinally within a groove 20 of another panel 10. The structural elements 10 are then located in a longitudinal side-by-side relationship which is shown in FIG. 2 of the drawings. As a result, the elements 10 are secured together in a snug manner. Different elements 10 are then to be connected to different panels 14 until the hexagonal shaped duct 16 is formed. If such is desired, additional elements 10 can be connected to the three outwardly extending members 14 that are located exteriorly of a particular duct 16 forming still further ducts 16. This arrangement is shown clearly in FIG. 3 of the drawings.

Also, referring particularly to FIG. 3, there is shown an end structural member 24 which can be utilized to connect with structural elements 10 and also other end wall members 24 to form a substantially flush exterior surface. Normally the end wall members 24 would be utilized to define the outer limits of the bank of ducts 16.

If duct 16 is to be utilized as a housing unit, it is considered that there will be formed access openings such as doors through connected together panels 14 so as to permit access from one duct 16 to another duct 16.

Referring particularly to FIG. 3, it can be seen that the connection of one panel 14 to another panel 14 results in substantially smooth inner and outer walls for each connected together set of panels 14. Referring particularly to FIG. 4 of the drawings it can be seen that the connected together structural elements 26 are formed in such a manner as to produce precisely flush exterior walls 28 and 30. Normally within a housing unit this would be the preferable form of construction. In reference to FIGS. 4 and 5, like numerals have been utilized to refer to like parts.

The primary distinction of the structural element 26 with respect to the structural elements 10 is that each panel 14 is capable of flexing slightly in respect to the hub 12 so as to vary the angular spacing of a panel 14 in respect to the other panels 14 of the particular structural element 26. This flexibility is shown in dotted lines within FIGS. 4 and 5.

The primary purpose of this flexing is to permit varying of the number of the structural elements 26 which are connected together about a single duct 16. Although, as shown in solid lines within FIG. 4, there are six in number of the elements 26 connected together, this number could be five, four or even three. Also, this number could be increased to seven, eight, nine or more. The primary reason for this flexibility is to provide for versatility in the construction of a specific assemblage.

What is claimed is:

1. An assemblage formed of a plurality of elongated structural elements, said assemblage comprising:
   each said elongated structural element being constructed in transverse cross-section of a hub from which extends a plurality of sheet material panels, each said panel having a free outer edge, said hub having a longitudinal center axis, each said panel substantially defining a plane, each said plane intersecting at said longitudinal center axis, said longitudinal center axis being totally confined within each said plane; and
   interlocking means connected to each said panel directly adjacent said free outer edge, said interlocking means of one said panel to matingly engage with a said interlocking means of another said panel of a separate elongated structural element forming a pair of interlocked said panels, said interlocked said panels substantially forming a continuous sheet material member having substantially flush abutting exterior wall surfaces.

2. The assemblage as defined in claim 1 wherein:
   interlocking of said panels occurring only by longitudinal relative movement between said pair of interlocked panels in a direction parallel to said longitudinal center axis.

3. The assemblage as defined in claim 1 wherein:
   each said interlocking means of each said panel being identical.

4. The assemblage as defined in claim 1 wherein:
   said panels being flexible permitting a limited amount of relative movement to said hub to vary the angular spacing between adjacent said panels of a said elongated structural element.

5. The assemblage as defined in claim 1 wherein:
   said elongated structural elements forming a totally enclosed space defining a duct.

6. The assemblage as defined in claim 5 wherein:
   there being sufficient said elements to form a bank of said ducts located parallel to each other.

7. The assemblage as defined in claim 1 wherein:
   said sheet material panels of each said structural element being evenly angularly spaced apart.

8. The assemblage as defined in claim 7 wherein:
   there being exactly three in number of said sheet material panels for each said elongated structural element.

9. The assemblage as defined in claim 5 wherein:
   interlocking of said panels occurring only by longitudinal relative movement between said pair of interlocked panels in a direction parallel to said longitudinal center axis.

10. The assemblage as defined in claim 9 wherein:
    each said interlocking means of each said panel being identical.

11. The assemblage as defined in claim 10 wherein:
    said elongated structural elements forming a totally enclosed space defining a duct.

12. The assemblage as defined in claim 11 wherein:
    there being sufficient said elements to form a bank of said ducts located parallel to each other.

* * * * *